(12) United States Patent
Loeppen et al.

(10) Patent No.: US 11,921,313 B2
(45) Date of Patent: Mar. 5, 2024

(54) FUNCTION DISPLAY FOR SELECTIVELY DISPLAYING SYMBOLS REPRESENTING SWITCHING FUNCTIONS AND/OR SWITCHING STATES WITH A REDUCED VEILING GLARE

(71) Applicant: Preh GmbH, Bad Neustadt a.d. Saale (DE)

(72) Inventors: Dennis Loeppen, Frankenheim (DE); Björn Morber, Münnerstadt (DE); Kilian Memmel, Fladungen (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 0 days.

(21) Appl. No.: 17/936,605

(22) Filed: Sep. 29, 2022

(65) Prior Publication Data

US 2023/0194767 A1    Jun. 22, 2023

(51) Int. Cl.
*F21V 8/00*      (2006.01)
*G02F 1/13357*   (2006.01)

(52) U.S. Cl.
CPC ......... *G02B 6/0043* (2013.01); *G02B 6/0076* (2013.01); *G02F 1/133615* (2013.01)

(58) Field of Classification Search
CPC ................ G02B 6/0043; G02B 6/0076; G02F 1/133615
See application file for complete search history.

(56) References Cited

U.S. PATENT DOCUMENTS

| 10,082,460 B1* | 9/2018 | Liu | G02B 6/0076 |
| 2002/0024803 A1* | 2/2002 | Adachi | G02B 6/0076 |
| | | | 362/240 |
| 2004/0135936 A1 | 7/2004 | Lee | |

(Continued)

FOREIGN PATENT DOCUMENTS

| DE | 102007035021 A1 * | 1/2009 | ....... B29D 11/00663 |
| DE | 102010052930 A1 | 5/2012 | |

(Continued)

OTHER PUBLICATIONS

English Machine Translation of Iwauchi TW 1235807 (Year: 2023).*

(Continued)

*Primary Examiner* — Donald L Raleigh
(74) *Attorney, Agent, or Firm* — M&B IP Analysts, LLC

(57) ABSTRACT

The present disclosure relates to a function display for selectively displaying symbols representing switching states for a motor vehicle including a light guide stack of at least two transparent or translucent, planar light guides arranged in an overlaid manner in a stacking direction, which are spaced apart by a transparent or translucent layer including a material that is optically thinner compared to the adjacent light guides so that the light guides have a main surface facing towards an observer and a main surface facing away from the observer that faces towards a light guide which is most closely adjacent in stacking direction; at least one light source per light guide arranged to couple light into the respective light guide via an end face; wherein one light-refractive and/or light-scattering microstructured portion per (Continued)

Figure 1:
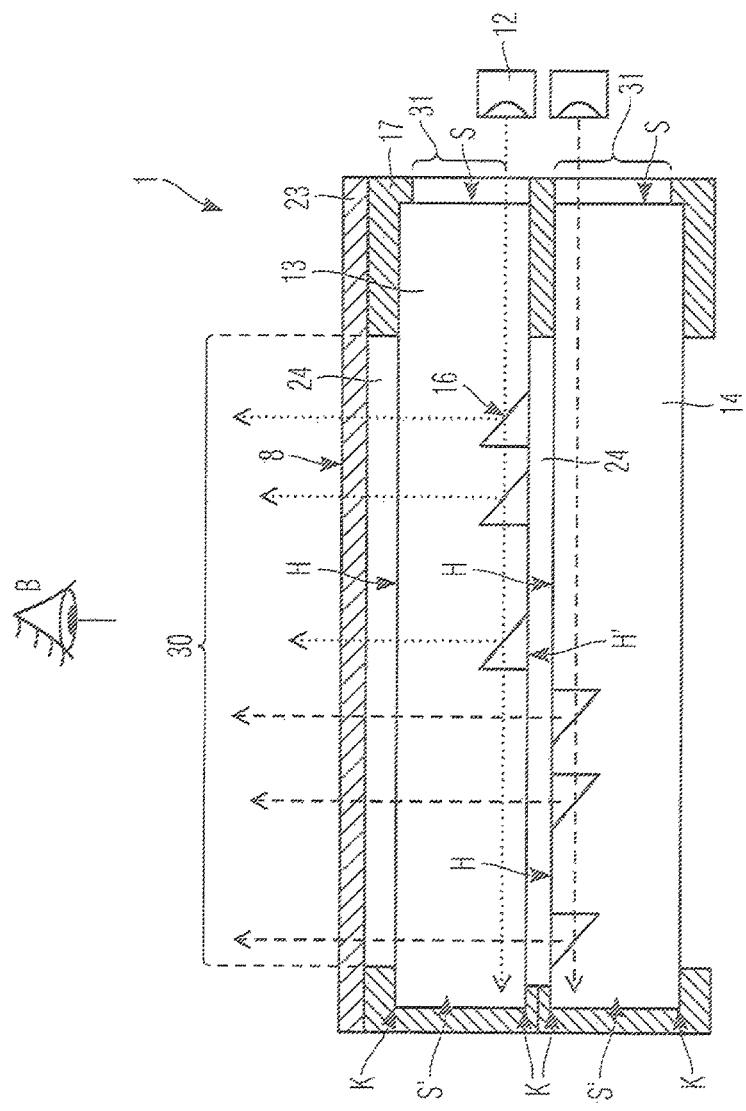

light guide, which is provided in or on the light guide, is provided for generating a symbol display.

16 Claims, 5 Drawing Sheets

(56) References Cited

U.S. PATENT DOCUMENTS

| | | | |
|---|---|---|---|
| 2010/0175971 A1* | 7/2010 | Kim | B60R 25/04 |
| | | | 200/313 |
| 2012/0113155 A1* | 5/2012 | Fang | G02B 6/0055 |
| | | | 362/97.1 |
| 2019/0391449 A1* | 12/2019 | Hao | G02B 6/0031 |
| 2020/0233136 A1* | 7/2020 | Kim | G02B 6/0065 |
| 2022/0120957 A1* | 4/2022 | Zhang | H05K 1/028 |

FOREIGN PATENT DOCUMENTS

| | | | | |
|---|---|---|---|---|
| DE | 102020123873 A1 | 3/2022 | | |
| TW | I235807 B | * | 7/2005 | G02B 6/0046 |

OTHER PUBLICATIONS

English Machine Translation of Dobler DE 102007035021 (Year: 2023).*

German Office Action for German Application No. 102021125442.6, German Patent and Trademark Office, München, Germany, dated: Apr. 4, 2022.

* cited by examiner

FUNCTION DISPLAY FOR SELECTIVELY DISPLAYING SYMBOLS REPRESENTING SWITCHING FUNCTIONS AND/OR SWITCHING STATES WITH A REDUCED VEILING GLARE

The present disclosure relates to a function display for selectively displaying symbols representing switching functions and/or switching states. For example, these function displays are required in a multi-functional operating element for the visualization of the switching functionalities and/or switching states connected with the operating element. Generally, electronic pixel matrix displays are used for this purpose. However, they are comparatively expensive and, due to their mostly rectangular shape, limit design and placement. Moreover, electronic pixel matrix display frequently exhibit a "burn-in" when depicting static display contents, i.e. the display contents remain permanently and unwantedly visible even when the display is turned off, due to visually perceptible damage to the imaging layers. Moreover, the power consumption of such electronic pixel matrix displays is comparatively high. In the case of certain applications, the use of conventional electronic pixel matrix displays is precluded due to the risk of injury, e.g. in the case of a head impact. Moreover, there is a demand for function displays that are largely transparent so that the region situated behind them remains visible to the observer. For example, the view onto the road surface or a part of the dashboard situated behind the function display, particularly the displays located there, are supposed to remain visible to the driver. For this reason, function displays with several stacked light guides including a transparent plastic are preferred, into which light is coupled in from the side and coupled out in some regions, e.g. by means of a scattering microstructured portion in the main surface of the light guides, in order to make a symbol visible. Due to the preferably prominent placement of such function displays in the field of vision of the vehicle operator, a leakage of light at an undesirable location is to be avoided at all costs. This relates both to light from the activated light source and to ambient light or extraneous light coupled into the light guide. It was found that edges of the light guide, in particular, are responsible for such undesirable light leakage or light reflections, which are referred to here as veiling glare.

Against this background, it is the object of the present disclosure to provide a function display which is inexpensive to produce and reduces the risk of injury, and which is improved with regard to the display quality and reduces, in particular, the risk of misinformation due to undesirable light leakage or light reflections. This object is achieved by a function display of the claim 1. A correspondingly advantageous operating element and a production method relating to the function display are each the subject matter of the independent claims. Advantageous embodiments are the subject matter of the respectively dependent claims. It must be remarked that the features cited individually in the patent claims can be combined in any technologically meaningful manner and depict other embodiments of the present disclosure. The description, in particular in connection with the figures, additionally characterizes and specifies the present disclosure.

The present disclosure relates to a function display for selectively displaying symbols representing switching functions and/or switching states, in particular for a motor vehicle. Selective displaying is understood to mean optionally displaying different symbols from a number of predefined symbols, which in the present solution is accomplished by selectively choosing and electrically energizing one or several light sources from a plurality of light sources.

According to the present disclosure, the function display comprises a light guide stack formed from at least two transparent or translucent, planar light guides arranged in an overlaid manner in a stacking direction. The light guides are separated by a transparent or translucent layer including a material that is optically thinner compared to material of the adjacent light guides. Preferably, an air gap is provided between the light guides. Given an arrangement of the function display as intended, the light guides each have at least one main surface, which faces towards an observer and in each case serves as a display surface, wherein in at least one light guide, the main surface facing away from the observer faces towards a light guide which is most closely adjacent in the stacking direction. The light guides are formed from a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA).

According to the present disclosure, at least one light source per light guide is provided, which is arranged so as to couple light into the respective light guide via a light entrance region arranged on one of the end faces of the associated light guide. For example, the light source is a light-emitting diode, particularly one with an SMD design. In order to improve the coupling-in of light and/or to adapt the light emission characteristics of the light source to the end face intended for the entrance of light into the light guide, a lens and/or a screen is disposed, for example, between the light guide and the light source. For example, the screen is also configured for suppressing the light transition towards other light guides next to the associated light guide.

Optionally, the function display according to the present disclosure comprises an outer transparent or translucent cover layer, which, given an arrangement of the function display as intended, forms an outer surface of the function display facing towards the observer. For example, this is a cover layer including a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), or a glass material, which is arranged so as to be spaced apart from the light guide stack by an air gap or a layer including an optically thinner material.

According to the present disclosure, further, one light-refractive and/or light-scattering microstructured portion per light guide is provided in or on the light guide, which is configured, if the light source is activated, to visibly display to the observer, in each case by means of the light coupled into the light guide, a backlit symbol. By means of light refraction and/or light scattering, the microstructured portion causes light to exit in the direction of the observer. For example, an angle of incidence of the light on the main surface facing towards the observer is achieved by means of the respective microstructure, which does not meet the conditions for total reflection of the main surface as an interface.

By selectively activating the light sources, different switching states or switching functions can be visualized in a comparatively simple manner. The function display is simple and cost-effective to realize and provides the designer with a large degree of designing leeway, which also pertains to the placement of the function display. The function display exhibits almost no ageing effects caused by light emission and is comparatively energy-saving. For example, the microstructured portion represents the symbol in a positive manner as an image, as the inverse representation thereof, or as its outline.

For example, the above-mentioned microstructured portion is formed from several uniformly spaced microstructured portions formed with identical shapes, wherein the microstructured portion only constitutes a part of the display surface, the so-called microstructured region, for each light guide. For example, the number density of the microstructures in the microstructured region is 1,000 to 2,000 per $mm^2$. For example, the microstructures each have a maximum diameter in the range from 1 to 25 µm. The microstructured portion can be incorporated into the respective light guide by laser ablation, e.g. three-dimensionally by vitrography, which is also referred to as internal laser engraving, or be applied to one of its main surfaces. Preferably, the microstructured portion is formed by stamping, e.g. during the manufacture of the light guide in an injection-molding process or by subsequent stamping, in one of the main surfaces per light guide, whereby the function display can be realized in a cost-effective manner.

In order to reduce structural height, for example, two directly adjacent light guides are provided whose microstructured portions are in each case exclusively provided on the main surfaces facing each other, wherein the microstructured regions are arranged offset with respect to one another from light guide to light guide.

For example, the function display is configured in such a way that, in spite of the microstructured regions, the function display is transparent in the predominant part of the stacked display surfaces, and that thus, the possibility of looking through the function display is ensured in order to provide the observer with the possibility of following other displays, instruments or the course of the road through the function display. For example, placing the function display on a steering wheel is possible, e.g. in the area between the steering wheel hub and the steering wheel rim, without impeding the view onto the dashboard.

According to the present disclosure, each light guide of the light guide stack has at least one, preferably several, edges which are disposed in or adjacent to one of the several end faces of the light guide, which are not intended for coupling in light via the light-entry surface, and which are referred to as remaining end faces. For example, the light guides have two opposing main surfaces, which preferably extend parallel to each other and which are connected to each other via end faces, which form common edges with the main surfaces of the light guide, e.g. at the narrow sides and at the long sides of the light guide. For example, the end faces extend substantially orthogonally to at least one main surface or both main surfaces of the light guide.

According to the present disclosure, an opaque and thus non-light-transmissive layer, which covers the respective edge, is provided. Thus, an undesirable leakage of light, in this case a so-called veiling glare, is avoided at the edge. This relates to light generated by the light source, but also to extraneous light, which is coupled into the light guide as ambient light, for example, and hits the respective edge after light propagation in the light guide. The coverage of the edges ensures coming closer to achieving, on the one hand, the intended goal of an exclusive exit of light in the microstructured region when the light source is activated and, on the other hand, the "disappearing" effect if the light source is turned off. The opaque coverage of the respective edge prevents an undesirable exit of light which prevents misinformation, but at least irritation, on the side of the observer.

Preferably, the opaque layer is applied so as to extend around the respective light guide along its remaining end faces while clearing the display surface of the main surfaces, in order to thus cause the light source to be shielded particularly efficiently.

Preferably, one of the main surfaces and one of the remaining end faces of the respective light guide are in each case adjacent to each other at the edge covered by the opaque layer.

According to a preferred embodiment, the opaque layer extends on both sides from the remaining end face across the respective edge and across the respectively adjacent main surface of the respective light guide up to the display surface thereof, and thus clasps the rim of the respective light guide forming the remaining end face.

In order to achieve a better wetting of the edge, the remaining end faces of each light guide are formed to be convex, according to a preferred embodiment. Moreover, the edges may be rounded.

Preferably, the light guide and the opaque layer are in each case connected by substance-to-substance connection. For example, this is accomplished by the light guide including the opaque layer connected therewith being manufactured as a molded article in a 2K injection-molding method.

Preferably, the light guide and the opaque layer are each formed from a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA). More preferably, the opaque layer is formed from a thermoplastic elastomer.

According to an alternative preferred embodiment, the opaque layer is a printed or paint layer. In one embodiment of the production method according to the present disclosure, the light guide is imprinted in a 3D digital printing process or a nozzle-less digital printing process, for example, in order to apply the opaque layer. According to another embodiment, the light guide is coated by spray application with a paint forming the opaque layer. Preferably, in this case, a removable and/or detachable masking layer is applied to the light guide prior to coating by printing or spraying, wherein the regions intended for the opaque layer, in particular the edge, remain uncoated. Then, the light guide is in each case coated over its full surface and, if necessary, on all sides, with the paint forming the opaque layer, and the masking layer is then removed, so that only the opaque layer remains in the region intended for it on at least one edge of the light guide.

The present disclosure further relates to an operating element, which comprises the function display in one of the above-described embodiments. For example, the operating element has a base for fixing the operating element to a vehicle component, such as a dashboard, a passenger compartment trim or, in particular, a steering wheel of a motor vehicle. For example, the operating element according to the present disclosure further has an operating part defining an operating surface, which is configured as at least one cantilevered lever arm. The cantilevered lever arm is, for example, unilaterally supported on the base by means of a flexure joint in order to enable a pivoting of the operating part about an imaginary pivot axis against a restoring force relative to the base in the event of an operating force acting vertically on the operating surface. For example, means are also provided for detecting a pivoting extent between the operating part and the base. A region of a component which permits two rigid-body regions to pivot with respect to each other by bending is referred to as a flexure joint. A play-free and thus rattle-free mounting of the operating part on the base is accomplished with the flexure joint. For example, the base and the operating part are formed from a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA). The operating element according to the present disclosure is particularly suitable for such embodiments in which the maximum pivoting extent about the imaginary pivot axis from the non-actuated rest position into the actuated maximum pivot position is less than 10°, preferably less than 5°.

Preferably, the function display is disposed underneath a translucent or transparent part of an operating surface of an operating part of the operating element to be operated by a touch or an actuation.

For example, the operating element is arranged on a steering wheel, which has a steering wheel hub, at least one steering wheel spoke and a steering wheel rim supported by the steering wheel spoke, for example. For example, the base of the operating element is non-rotatably fixed to the steering wheel rim. Preferably, the display surface of the function display is disposed between the steering wheel rim and the steering wheel hub or an impact absorber of the steering wheel covering the steering wheel hub.

Figure 2:
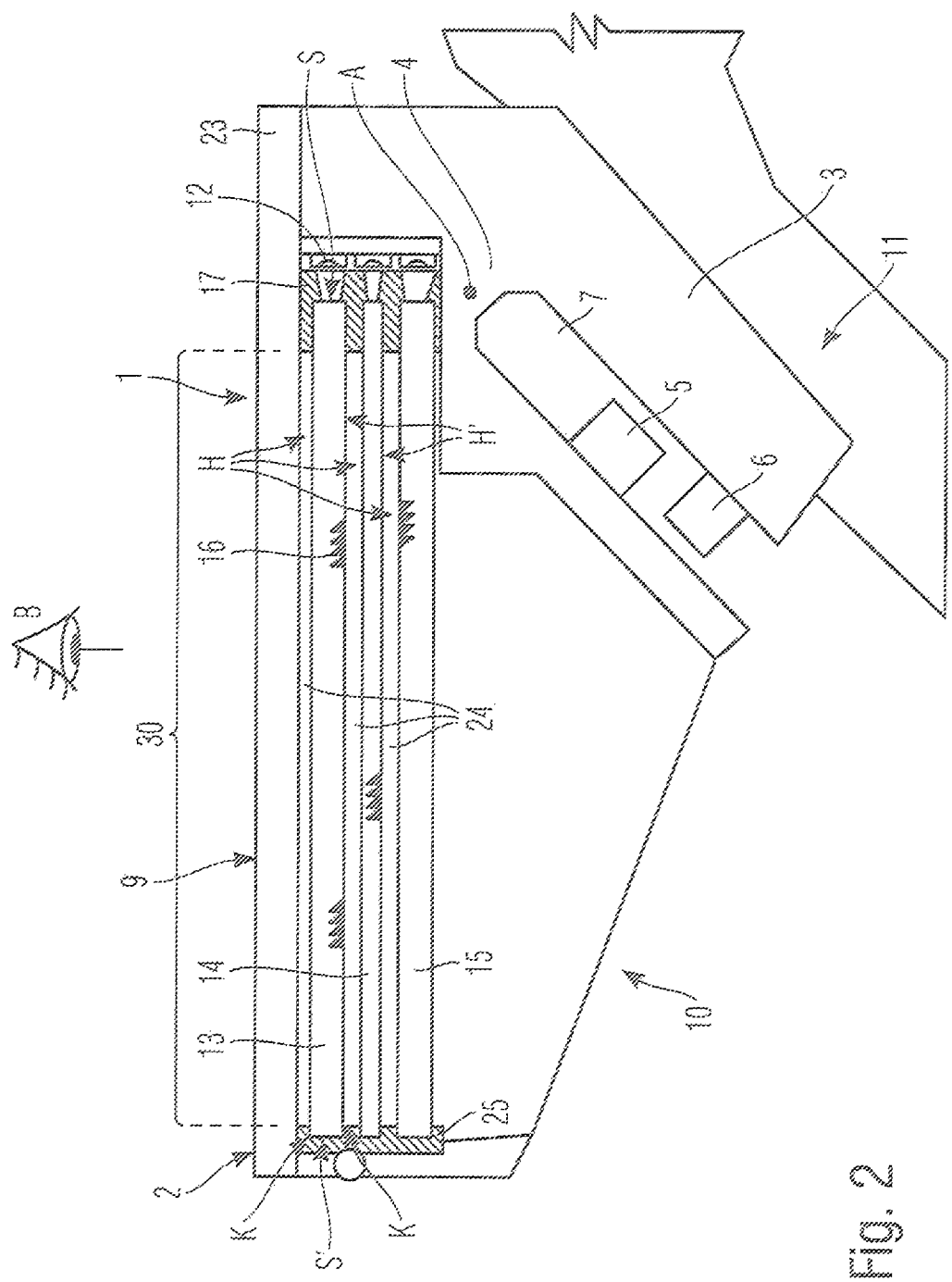
Figure 3:
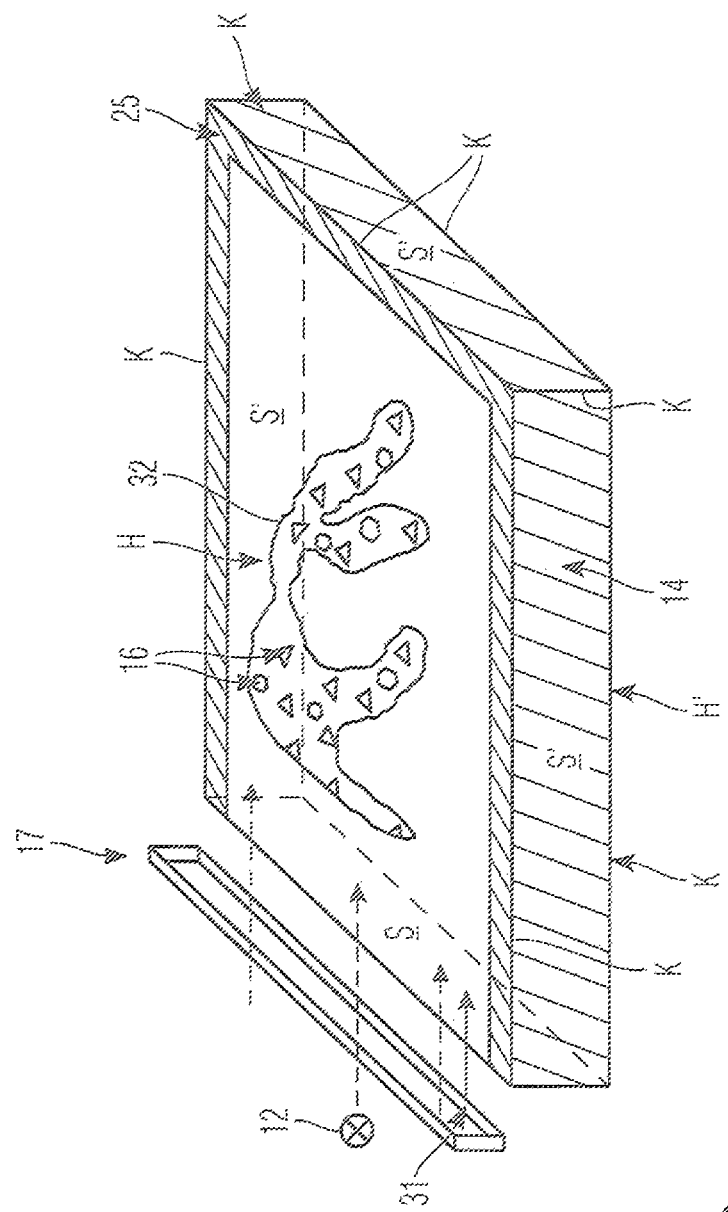
Figure 4:
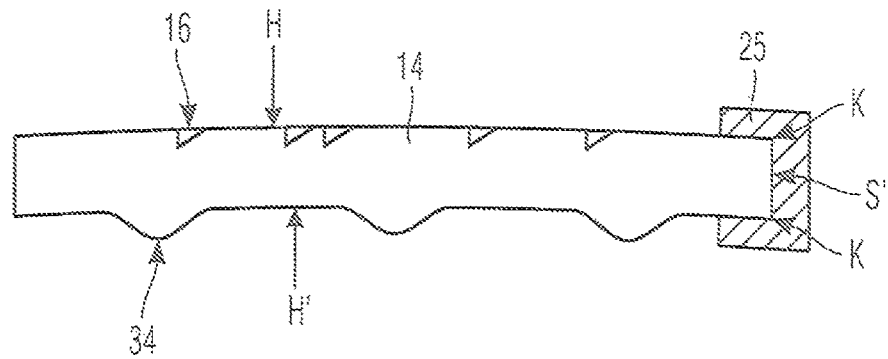
Figure 5A:
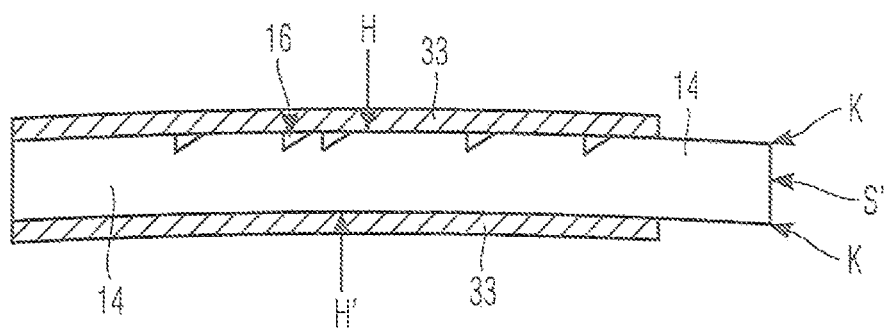
Figure 5B:
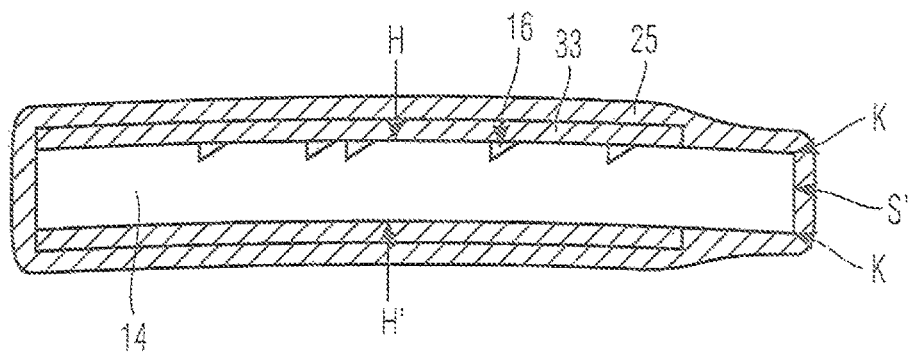
Figure 5C:
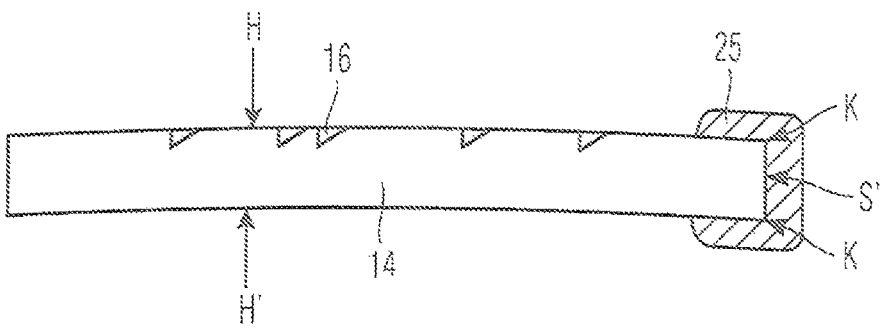
Figure 6:
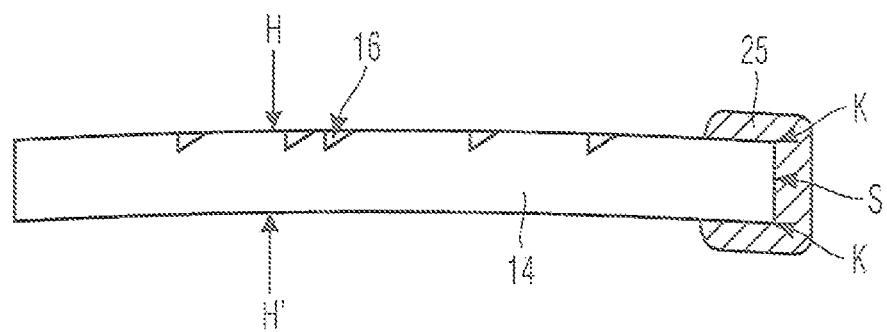

The various embodiments as well as the technical environment will be explained in more detail below with reference to the Figures. It must be remarked that the Figures depict a particularly preferred embodiment of the disclosed embodiments, but that the latter is not limited thereto. The Figures schematically show:

FIG. 1 a schematic cross-sectional view of an embodiment of a function display 1 according to the embodiment;

FIG. 2 a schematic cross-sectional view of an embodiment of an operating element 10 according to the embodiment, with a function display in a second embodiment according to the embodiment;

FIG. 3 a perspective view of a light guide 14 of the embodiment of the function display 1 shown in FIG. 1;

FIG. 4 a cross-sectional view a light guide 4 of a third embodiment of the function display 1;

FIGS. 5a-5c illustrations for explaining an embodiment of the method of the embodiment for producing a light guide for a fourth embodiment of the function display 1;

FIG. 6 a cross-sectional view of a light guide 4 of a fifth embodiment of the function display 1.

FIG. 1 schematically shows an embodiment according to the embodiment of the function display 1. The function display 1 according to the disclosed embodiment optionally comprises an outer transparent or translucent cover layer 23 which, given an arrangement of the function display 1 as intended, defines a surface 8 facing towards the observer B, and through which the superposed display surfaces 30 of several stacked light guides 13, 14 are visible. For example, this is a cover layer including a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), or a glass material.

According to the disclosed embodiment, the function display 1 further comprises a light guide stack formed from at least two transparent or translucent, planar light guides 13, 14 which are arranged in an overlaid manner and respectively formed from a thermoplastic plastic layer. The light guides 13, 14 are separated by an air gap 24 provided between the light guides 13, 14. The light guides 13, 14 each form one main surface H facing towards the observer B and a main surface H' facing away from the observer B, while the upper light guide 13 that is closer to the observer B has a main surface H' which faces away from the observer B and faces towards the light guide 14 which is most closely adjacent in the stacking direction. At least one light source 12, i.e. one or several light-emitting diodes with an SMD design, which are arranged in such a way that the light produced by them is coupled into the assigned light guide 13, 14 via a light entrance region 31 of an end face S situated towards the side with regard to the stacking direction, is in each case assigned to the light guides 13, 14. Accordingly, the remaining end faces S', i.e. the ones not intended for coupling in light, have no light entrance region. In order to avoid unwanted light scattering or light emission into the adjacent light guides 13, 14 in each case while coupling in light, a screen 17 is provided. At the remaining end face or end faces S' opposite the light sources 12, an opaque layer 25 is applied in such a way that not only are the edges K of the respective light guide 13, 14 covered, but also the remaining end face S' is in each case covered across its entire surface. In this case, the opaque layer 25 extends on both sides from the remaining end face S' across the respective edge K and across the respectively adjacent main surface H, H' of the respective light guide 13, 14 up to the display surface 30 thereof, so that the respective edge of the light guide 13, 14 is being clasped. As can be seen in FIG. 1, this relates to, on the one hand, those edges K at which one of the main surfaces H, H' and the remaining end face S' are in each case adjacent to each other, but as FIG. 3 shows, on the other hand also those edges K at which two remaining end faces S' are adjacent to each other, since the opaque layer 25 is applied so as to extend around the respective light guide 13, 14 along its remaining end faces S' while clearing the display surface S and the display surface 30 of the main surfaces H, H'.

As can be seen from FIGS. 1 and 3, a microstructured portion 16 formed by several microstructures is incorporated by stamping into at least one of the main surfaces H, H' of the light guides 13, 14, which ensures that light is coupled out of the respective light guide 13, 14 in the direction of the observer B. The microstructures are uniformly and equally spaced apart and, in their entirety, form a contiguous microstructured region 32 for each light guide 13, 14, whose outline corresponds to the shape of a symbol, which becomes visible to the observer B if the associated light source 12 is activated accordingly. The microstructures of the microstructured portion 16 are each configured so as to be identically shaped, and have a diameter in the range from 1 to 25 μm. In order to reduce structural height, in the two directly adjacent light guides 13, 14, the microstructures 16 are provided in the main surfaces H, H' facing each other.

All light guides 13, 14 outside the microstructured region are transparent, so that a large part of the display surface 30 remains transparent in each case, and, for example, the possibility of looking through the function display 1 is ensured in order to provide the observer B with the possibility of following other displays or the course of the road through the function display. For example, placing the function display 1 on a steering wheel is thus possible, e.g. in the area between the steering wheel hub and the steering wheel rim, without impeding the view onto the dashboard. Looking vertically at the stacked display surfaces 30, the microstructured regions 32 of the light guides 13, 14 do not overlap in order not to affect the quality of the depiction of the symbols.

FIG. 2 shows an embodiment of the operating element 10 according to the disclosed embodiment, into which a function display 1 according to the disclosed embodiment of a second embodiment is integrated. This operating element 10 has a base 3 for fixing the operating element 10 to a vehicle component, such as a dashboard, a passenger compartment trim or, in particular, a steering wheel rim 11 of a motor vehicle steering wheel. Moreover, the operating element 10 according to the embodiment has an operating part 2 defining the operating surface 9, which is configured as at least one cantilevered lever arm. The cantilevered lever arm is in each case unilaterally supported on the base 3 by means of a flexure joint 4 in order to enable a pivoting of the operating part 2 about an imaginary pivot axis A against a restoring force relative to the base 3 in the event of an actuating force acting vertically on the operating surface 9. For example, the restoring force is the result of the deformation of the flexure joint 4.

According to the embodiment, means 6 are also provided for detecting a pivoting extent between the operating part 2 and the base 3. The flexure joint 4 is formed only by an integral connection between the base 3 and the operating part 2. The operating element 10 according to the embodiment is particularly suitable for such embodiments in which the maximum pivoting extent about the imaginary pivot axis A from the non-actuated rest position shown in FIG. 2 into a maximally possible actuated pivot position is less than 10°, preferably less than 5°.

According to the embodiments, further, an actuator 5 is provided for generating an active haptic feedback, also referred to as a haptically perceptible output, which can be supplied with an electric control signal by means of an electronic control system that is not depicted, wherein the actuator 5 is preferably exclusively fixed to the operating part 2. Preferably, the actuator 5 is an inertia-based, motor-based actuator, such as a motor on whose rotating drive shaft a mass is mounted eccentrically with respect to its center of gravity, or a magnetic coil actuator, or a piezoelectric actuator, or a linear wide-band actuator, such as a voice coil actuator or a linear resonance actuator. Preferably, the actuator 5 is fixed to the operating part 2 in a positive manner or by substance-to-substance connection, e.g. by screwing or gluing. Due to the exclusive fixation on the operating part 2, a coupling of structure-borne sound into the steering wheel rim 11 and thus into the vehicle component is suppressed or at least minimized.

The means 6 detecting the pivoting extent are configured for capacitively, optically and/or inductively detecting a relative movement, preferably a convergence, between the base 3 and the operating part 2. The play-free mounting of the operating part 2, which is realized by the flexure joint 4, in cooperation with the means 6 detecting, preferably in a contact-free manner, the pivoting extent results in a low-hysteresis to hysteresis-less detection of the actuating force, which is provided for triggering, for example, a switching or controlling function or at least the output of an optical, acoustical or a haptically perceptible output.

The stacked display surfaces 30 of the light guides 13, 14, 15 of the function display 1 are visible underneath the operating surface 9 provided by the surface of the transparent cover layer 23. Also in this case, the function display 1 is configured to be largely transparent in order to ensure the unimpeded view of the observer B or operator through the function display 1 onto the operating panel situated behind it, such as the instruments of a dashboard.

The second embodiment of the function display 1 according to the disclosed embodiment in FIG. 2 comprises a light guide stack formed from three transparent or translucent, planar light guides 13, 14, 15 which are arranged in an overlaid manner and respectively formed from a thermoplastic plastic. The light guides 13, 14, 15 are each separated by an air gap 24 provided between the light guides 13, 14, 15. The light guides 13, 14, 15 each form at least one main surface H facing towards the observer, while the two upper light guides 13, 14 that are closer to the observer B each have a main surface H' which faces away from the observer and faces towards the light guide 14 or 15 which is most closely adjacent in the stacking direction. At least one light source 12, i.e. a light-emitting diode with an SMD design, which is arranged in such a way that the light produced by it is coupled into the assigned light guide 13, 14, 15 via an end face situated towards the side with regard to the stacking direction, is assigned in each case to the light guides 13, 14, 15. In order to avoid, in the process, unwanted light scattering or light emission into the adjacent light guides 13, 14, 15 in each case, a screen 17 is provided. At the remaining end face or end faces S' opposite the light sources 12, an opaque layer 25 is applied in such a way that not only are the edges K of the respective light guide 13, 14, 15 covered, but also the remaining end face S' is in each case covered across its entire surface. In this case, the opaque layer 25 extends on both sides from the remaining end face S' across the respective edge K and across the respectively adjacent main surface H, H' of the respective light guide 13, 14, 15 up to the display surface 30 thereof. The relates to, on the one hand, those edges K at which one of the main surfaces H, H' and the remaining end face S' are in each case adjacent to each other, but on the other hand also those edges K at which two remaining end faces S' are adjacent to each other, since the opaque layer 25 is applied so as to extend around the respective light guide 13, 14, 15 along its remaining end faces S' while clearing the display surface S and the display surface 30 of the main surfaces H, H', which is not apparent from the sectional view of FIG. 2, however.

A microstructured portion 16 formed by several microstructures is incorporated by stamping into at least one of the main surfaces H, H' of the light guides 13, 14, 15, which ensures that light is coupled out of the respective light guide 13, 14, 15 in the direction of the observer B. The microstructures are uniformly and equally spaced apart and, in their entirety, form a contiguous microstructured region for each light guide 13, 14, 15, whose outline corresponds to the shape of a symbol, which becomes visible to the observer B if the associated light source 12 is activated accordingly. The microstructures of the microstructured portion 16 are each configured so as to be identically shaped, and have a diameter in the range from 1 to 25 μm.

All light guides 13, 14, 15 outside the microstructured region are transparent, so that a large part of the display surfaces 30 in each case remains transparent, and, for example, the possibility of looking through the function display 1 is ensured in order to provide the observer B with the possibility of following other displays or the course of the road through the function display.

For example, placing the function display 1 on a steering wheel is thus possible, e.g. in the area between the steering wheel hub and the steering wheel rim, without impeding the view onto the dashboard.

FIG. 4 shows another embodiment of the light guide 14 as it is used, by way of example, for all light guides in a third embodiment of the function display 1. In this embodiment, the light guide 14 and the opaque layer 25 are in each case connected by substance-to-substance connection. This is accomplished by the light guide 14, as an example for all light guides of the third embodiment, inclusive of the opaque layer 25 connected therewith, being manufactured as a molded article in a 2K injection-molding method. By shaping the tool accordingly, the light guide 14 has several projections 34 in its main surface H' as spacers, which, when arranged in the light guide stack of the function display 1, rest against the most closely adjacent light guide and ensure the spacing from this light guide that forms the air gap. The light guide 14 is formed from a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), whereas the opaque layer 25 is formed from a thermoplastic elastomer.

By way of example, FIGS. 5a to 5c show, for the light guide 14, a multi-stage production method for a fourth embodiment of the function display 1. First, a removable and/or detachable masking layer 33 is applied to the light guide 14, wherein the region of the light guide 14 to be coated with the opaque layer 24, in particular at least one of its edges K, remains clear. Then, the light guide 14 is in each case coated by printing or spraying over its full surface and, if necessary, on all sides, with the paint forming the opaque layer 25, and the masking layer 33 is then removed, so that only the opaque layer 25 remains in the region intended for it on at least one edge K of the light guide 14.

By way of example, FIG. 6 shows a light guide 14, which is an example for all light guides of a fifth embodiment of the function display 1 according to the embodiment. In this case, the opaque layer 25 is applied in a 3D printing process on the light guide 14, which is produced from a thermoplastic material with an injection-molding method.

What is claimed is:

1. A function display for selectively displaying symbols representing switching functions and/or switching states, in particular for a motor vehicle, comprising:
    a light guide stack of at least two transparent or translucent, planar light guides arranged in an overlaid manner in a stacking direction, which are arranged so as to be spaced apart by a transparent or translucent layer including a material that is optically thinner compared to the planar light guides so that the planar light guides each have as a display surface a main surface (H) facing towards an observer and, in at least one planar light guide, the main surface (H') facing away from the observer faces towards an adjacent light guide of the planar light guides which is most closely adjacent in a stacking direction;
    at least one light source per light guide of the planar light guides, which is arranged so as to couple a light into a respective light guide via a light entrance region arranged in each case on one end face of end faces of the respective light guide;
    wherein each light guide of the light guide stack has at least one of: a light-refractive microstructured portion and a light-scattering microstructured portion, which is provided in or on the light guide and which is configured, if the light source is activated, to display to the observer, in each case by means of the light coupled into the light guide, a backlit symbol in a manner visible through a cover layer; and
    wherein each light guide forms at least one edge formed adjacent to or in remaining end faces next to the one end face having the light entrance region; and further an opaque layer, which covers the respective at least one edge and which is applied to the respective light guide, wherein the opaque layer extends on both sides from the remaining end faces across the respective edge and across the respectively adjacent at least one of: the main surface facing towards the observer and the main surface facing away from the observer of the respective light guide up to the display surface thereof.

2. The function display according to claim 1, wherein the opaque layer is applied so as to extend around the respective light guide along the remaining end faces while clearing the display surface of the main surface facing towards the observer and the main surface facing away from the observer.

3. The function display according to claim 1, wherein in each case one of the main surface facing towards the observer and the main surface facing away from the observer and one of the remaining end faces are adjacent to each other at the edge covered by the opaque layer.

4. The function display according to claim 1, wherein the outer cover layer forms a surface facing towards the observer and the outer cover layer is any one of: a transparent cover layer and a translucent cover layer.

5. The function display according to claim 3, wherein the remaining end faces of each light guide are formed to be convex.

6. The function display according to claim 1, wherein the light guide and the opaque layer are in each case connected by a substance-to-substance connection.

7. The function display according to claim 1, wherein the light guide and the opaque layer are in each case formed from a thermoplastic material.

8. The function display according to claim 7, wherein the opaque layer is formed from a thermoplastic elastomer.

9. The function display according to claim 1, wherein the opaque layer is any one of: a printed layer and a paint layer.

10. An operating element, in particular for a steering wheel of a motor vehicle, comprising a function display, wherein the function display comprises:
    a light guide stack of at least two transparent or translucent, planar light guides arranged in an overlaid manner in a stacking direction, which are arranged so as to be spaced apart by a transparent or translucent layer including a material that is optically thinner compared to the planar light guides, preferably an air gap, so that the planar light guides each have as a display surface a main surface (H) facing towards an observer and, in at least one planar light guide, the main surface (H') facing away from the observer faces towards an adjacent light guide of the planar light guides which is most closely adjacent in a stacking direction;
    at least one light source per light guide of the planar light guides, which is arranged so as to couple a light into a respective light guide via a light entrance region arranged in each case on one end face of end faces of the respective light guide;
    an optional outer transparent or translucent cover layer forming a surface facing towards the observer;
    wherein each light guide of the light guide stack has at least one of: a light-refractive microstructured portion and a light-scattering microstructured portion, which is provided in or on the light guide and which is configured, if the light source is activated, to display to the observer, in each case by means of the light coupled into the light guide, a backlit symbol in a manner visible through the cover layer;

and wherein each light guide forms at least one edge formed adjacent to or in remaining end faces next to the one end face having the light entrance region; and further an opaque layer, which covers the respective at least one edge and which is applied to the respective light guide, wherein the opaque layer extends on both sides from the remaining end faces across the respective edge and across the respectively adjacent at least one of: the main surface facing towards the observer and the main surface facing away from the observer of the respective light guide up to the display surface thereof.

11. The operating element according to claim 10, wherein the function display is disposed underneath a translucent or transparent part of an operating surface of an operating part of the operating element to be operated by any one of: a touch and an actuation.

12. A method for producing a function display, comprising: injection-molding each light guide of a light guide stack, wherein the light guide is formed from a thermoplastic material; and incorporating a microstructured portion into the respective light guide during any one of: the injection-molding and a subsequent stamping process, wherein the function display comprises:

the light guide stack of at least two transparent or translucent, the planar light guides arranged in an overlaid manner in a stacking direction, which are arranged so as to be spaced apart by a transparent or translucent layer including a material that is optically thinner compared to the planar light guides, preferably an air gap, so that the planar light guides each have as a display surface a main surface (H) facing towards an observer and, in at least one planar light guide, the main surface (H') facing away from the observer faces towards an adjacent light guide of the planar light guides which is most closely adjacent in a stacking direction;

at least one light source per light guide of the planar light guides, which is arranged so as to couple a light into a respective light guide via a light entrance region arranged in each case on one end face of end faces of the respective light guide;

an optional outer transparent or translucent cover layer forming a surface facing towards the observer;

wherein each light guide of the light guide stack has the microstructured portion that is at least one of: a light-refractive microstructured portion and a light-scattering microstructured portion, which is provided in or on the light guide and which is configured, if the light source is activated, to display to the observer, in each case by means of the light coupled into the light guide, a backlit symbol in a manner visible through the cover layer; and wherein each light guide forms at least one edge formed adjacent to or in remaining end faces next to the one end face having the light entrance region; and further an opaque layer, which covers the respective at least one edge and which is applied to the respective light guide, wherein the opaque layer extends on both sides from the remaining end faces across the respective edge and across the respectively adjacent at least one of: the main surface facing towards the observer and the main surface facing away from the observer of the respective light guide up to the display surface thereof.

13. The method according to claim 12, wherein each light guide covered with the opaque layer is manufactured in a 2K injection molding step.

14. The method according to claim 12, wherein each light guide is coated by any one of: printing and spraying in order to form the opaque layer.

15. The method according to claim 14, wherein each light guide, prior to coating to form the opaque layer, is first coated with a masking layer and the masking layer is removed after the coating.

16. The function display according to claim 1, wherein the planar light guides are arranged so as to be spaced apart by an air gap.

* * * * *